United States Patent
Tezuka (10) Patent No.: US 10,744,612 B2
(45) Date of Patent: Aug. 18, 2020

(54) ROTARY TABLE DEVICE

(71) Applicant: FANUC CORPORATION, Yamanashi (JP)

(72) Inventor: Hiroki Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/154,749

(22) Filed: Oct. 9, 2018

(65) Prior Publication Data

US 2019/0126422 A1 May 2, 2019

(30) Foreign Application Priority Data

Nov. 1, 2017 (JP) .................................. 2017-212025

(51) Int. Cl.
*B23Q 16/10* (2006.01)
*B23Q 11/08* (2006.01)
(Continued)

(52) U.S. Cl.
CPC ............... *B23Q 16/10* (2013.01); *B23Q 1/25* (2013.01); *B23Q 11/005* (2013.01);
(Continued)

(58) Field of Classification Search
CPC ........ B23Q 16/10; B23Q 1/25; B23Q 11/005; B23Q 11/0858; B23Q 15/00; B23Q 17/005; B23Q 2220/004; G05B 2219/50183
See application file for complete search history.

(56) References Cited

U.S. PATENT DOCUMENTS

| 2011/0126985 A1* | 6/2011 | Ohizumi | ........... C23C 16/45546 156/345.55 |
| 2016/0346956 A1* | 12/2016 | Takekawa | ............... B28D 7/005 |
| 2019/0126422 A1* | 5/2019 | Tezuka | ..................... B23Q 1/25 |

FOREIGN PATENT DOCUMENTS

| GB | 2177327 B | * | 8/1988 | ........... B23Q 17/005 |
| JP | 2014-030864 A | | 2/2014 | |

(Continued)

OTHER PUBLICATIONS

An Office Action mailed by the Japanese Patent Office dated Aug. 27, 2019, which corresponds to Japanese Patent Application No. 2017-212025 and is related to U.S. Appl. No. 16/154,749.

*Primary Examiner* — Vicky A Johnson
(74) *Attorney, Agent, or Firm* — Studebaker & Brackett PC (57) ABSTRACT

To provide a rotary table device that can prevent the occurrence of malfunction before it happens. A rotary table device equipped with both or one of a clamping mechanism and purge mechanism which operate by way of working fluid, the rotary table device including: a detection unit that detects a pressure or flow rate of the working fluid; a transition information storage unit that acquires and stores transition information related to transition of a pressure value or flow rate value of the working fluid detected by the detection unit; a judgment value storage unit that stores in advance a plurality of sets of judgment value information related to judgment values for judging a pressure value or flow rate value of the working fluid; and a notification unit that notifies of notification information according to the pressure value or flow rate value of the working fluid, based on the transition information stored in the transition information storage unit and the plurality of sets of judgment value information stored in the judgment value storage unit.

3 Claims, 5 Drawing Sheets

(51) Int. Cl.
*B23Q 11/00* (2006.01)
*B23Q 17/00* (2006.01)
*B23Q 1/25* (2006.01)
*B23Q 15/00* (2006.01)

(52) U.S. Cl.
CPC .......... *B23Q 11/0858* (2013.01); *B23Q 15/00* (2013.01); *B23Q 17/005* (2013.01); *B23Q 2220/004* (2013.01); *G05B 2219/50183* (2013.01)

(56) References Cited

FOREIGN PATENT DOCUMENTS

| | | |
|---|---|---|
| JP | 2015-160262 A | 9/2015 |
| JP | 2016-219756 A | 12/2016 |

* cited by examiner

ROTARY TABLE DEVICE

This application is based on and claims the benefit of priority from Japanese Patent Application No. 2017-212025, filed on 1 Nov. 2017, the content of which is incorporated herein by reference.

BACKGROUND OF THE INVENTION

Field of the Invention

The present invention relates to a rotary table device.

Related Art

In machine tools, rotary table devices are widely used. The rotary table device has a rotating shaft which is rotatable, and performs fixing and indexing, etc. of a workpiece, tool, etc. on a face plate of the rotating shaft. Conventionally, for retaining the index position, a clamping mechanism that makes the rotating shaft unrotatable may be mounted to the rotary table device (for example, refer to Patent Document 1). The clamping mechanism performs clamping by pushing a brake disk fixed to the rotating shaft to a fixed member by a piston, and performs unclamping by separating the piston from the brake disk. Pneumatic or hydraulic pressure is used in driving of the piston. The air used for the pneumatic pressure or oil used for hydraulic pressure for driving the piston is supplied to the rotary table device.

In addition, an air purge mechanism capable of performing air purging by supplying air to the inside of the case of the rotary table device may be included in the rotary table device (for example, refer to Patent Document 2). By performing air purging in the air purge mechanism, it is possible to prevent the intrusion of cutting fluid to the inside of the case, by setting the pressure inside of the case of the rotary table device higher than the atmospheric pressure.

Patent Document 1: Japanese Unexamined Patent Application, Publication No. 2014-30864

Patent Document 2: Japanese Unexamined Patent Application, Publication No. 2015-160262

SUMMARY OF THE INVENTION

A working fluid such as air (or oil) or the like is used in the clamping/unclamping operation. In addition, a working fluid such as air is used in the air purge. When the pressure or flow rate of working fluid declines, there is a possibility of leading to a decline in clamping/unclamping force and delay in clamping/unclamping operation. In addition, there is a possibility of the air purge pressure declining and cutting oil infiltrating inside of the case.

In contrast, conventionally, the pressure or flow rate of working fluid is detected by a detector, and when the pressure value or flow rate value of working fluid becomes no more than a set threshold, it is controlled so as to notify an alarm, message or the like as being abnormal. However, if being control simply informing in the case of becoming no more than a set threshold, after the occurrence of malfunction, the malfunction comes to be abruptly informed, and it has been difficult to prevent the occurrence of the malfunction before it happens.

The present invention has an object of providing a rotary table device that can prevent the occurrence of malfunction before it happens.

The present invention relates to a rotary table device equipped with both or one of a clamping mechanism (for example, the clamping mechanism 4 described later) and purge mechanism (for example, the air purge mechanism 8 described later) which operate by way of working fluid, the rotary table device including: a detection unit (for example, the detector 11 described later) that detects a pressure or flow rate of the working fluid; a transition information storage unit (for example, the transition information storage section 251 described later) that acquires and stores transition information related to transition of a pressure value or flow rate value of the working fluid detected by the detection unit; a judgment value storage unit (for example, the judgment value storage section 252 described later) that stores in advance a plurality of sets of judgment value information related to judgment values for judging a pressure value or flow rate value of the working fluid; and a notification unit (for example, the notification section 220 described later) that notifies of notification information according to the pressure value or flow rate value of the working fluid, based on the transition information stored in the transition information storage unit and the plurality of sets of judgment value information stored in the judgment value storage unit).

In addition, the judgment value storage unit may store in advance a plurality of judgment ranges for judging the pressure value or flow rate value of the working fluid, as the plurality of sets of judgment value information; the plurality of judgment ranges may include an NG range, a recommended range, and an caution range between the NG range and the recommended range; and the notification unit notifies of a first notification matter as the notification information, in a case of the pressure value or flow rate value of the working fluid being in a declining trend in the recommended range, and notifies of a second notification matter as the notification information, in a case of the pressure value or flow rate value of the working fluid transitioning in the caution range.

In addition, the first notification matter may be a notification matter prompting alert; and the second notification matter may be a notification matter of a warning prompting to raise the pressure value or flow rate value of the working fluid.

According to the present invention, it is possible to provide a rotary table device that can prevent the occurrence of malfunction before it happens.

DETAILED DESCRIPTION OF THE INVENTION

Figure 1:
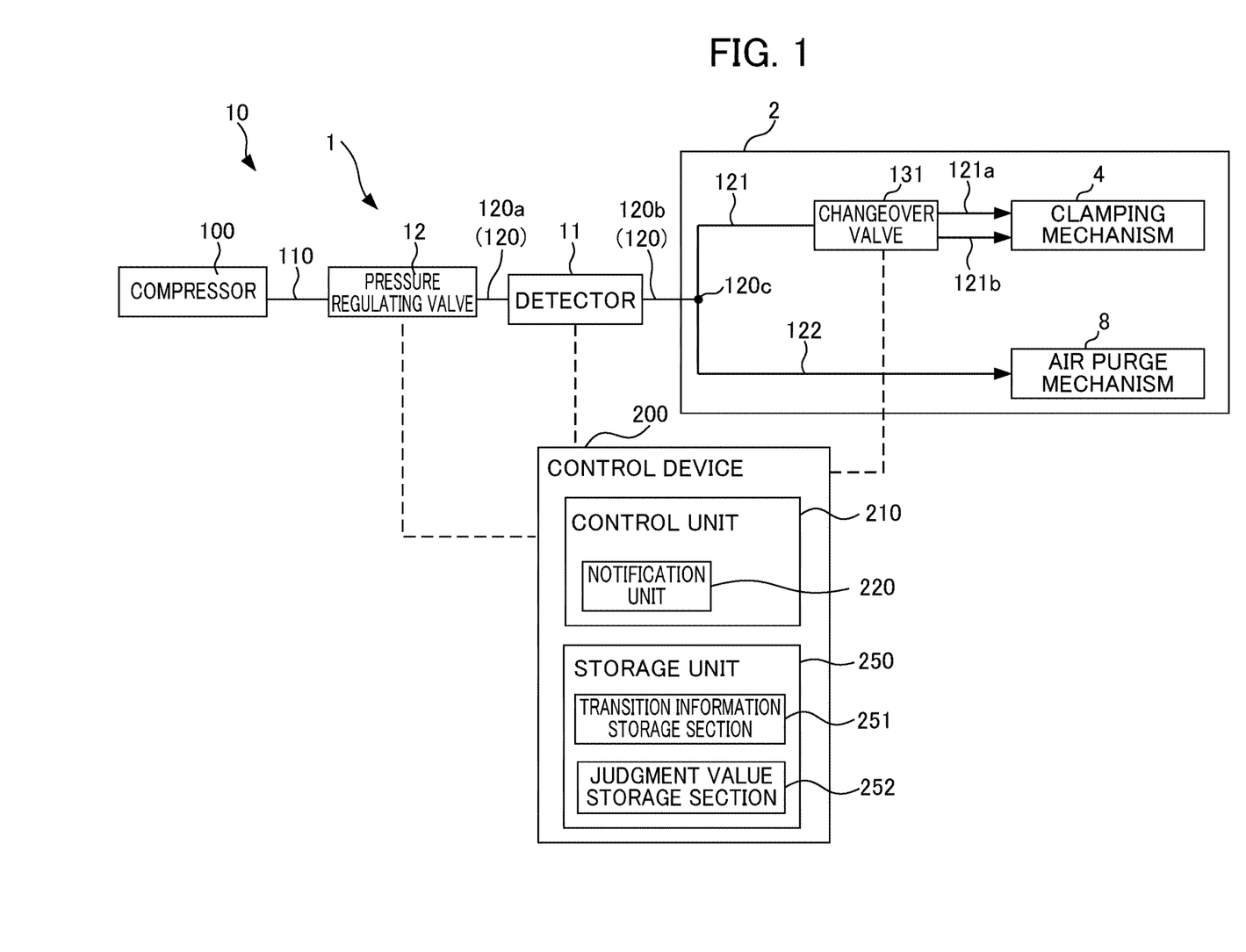
FIG. 1 is a block diagram showing an outline of a rotary table system according to the present invention.
Figure 2:
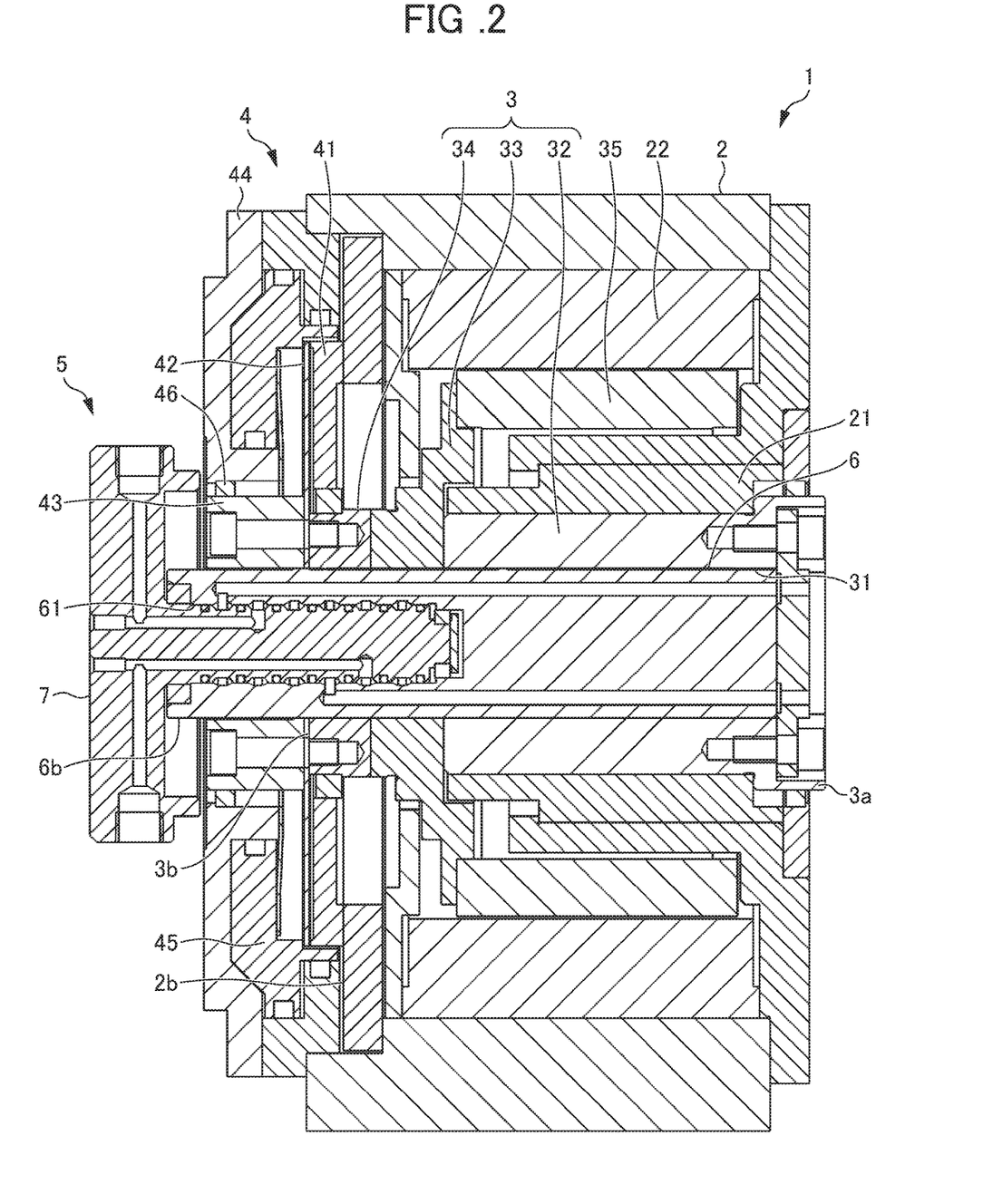
FIG. 2 is a cross-sectional view showing an example of a rotary table device according to the present invention.
Figure 3:
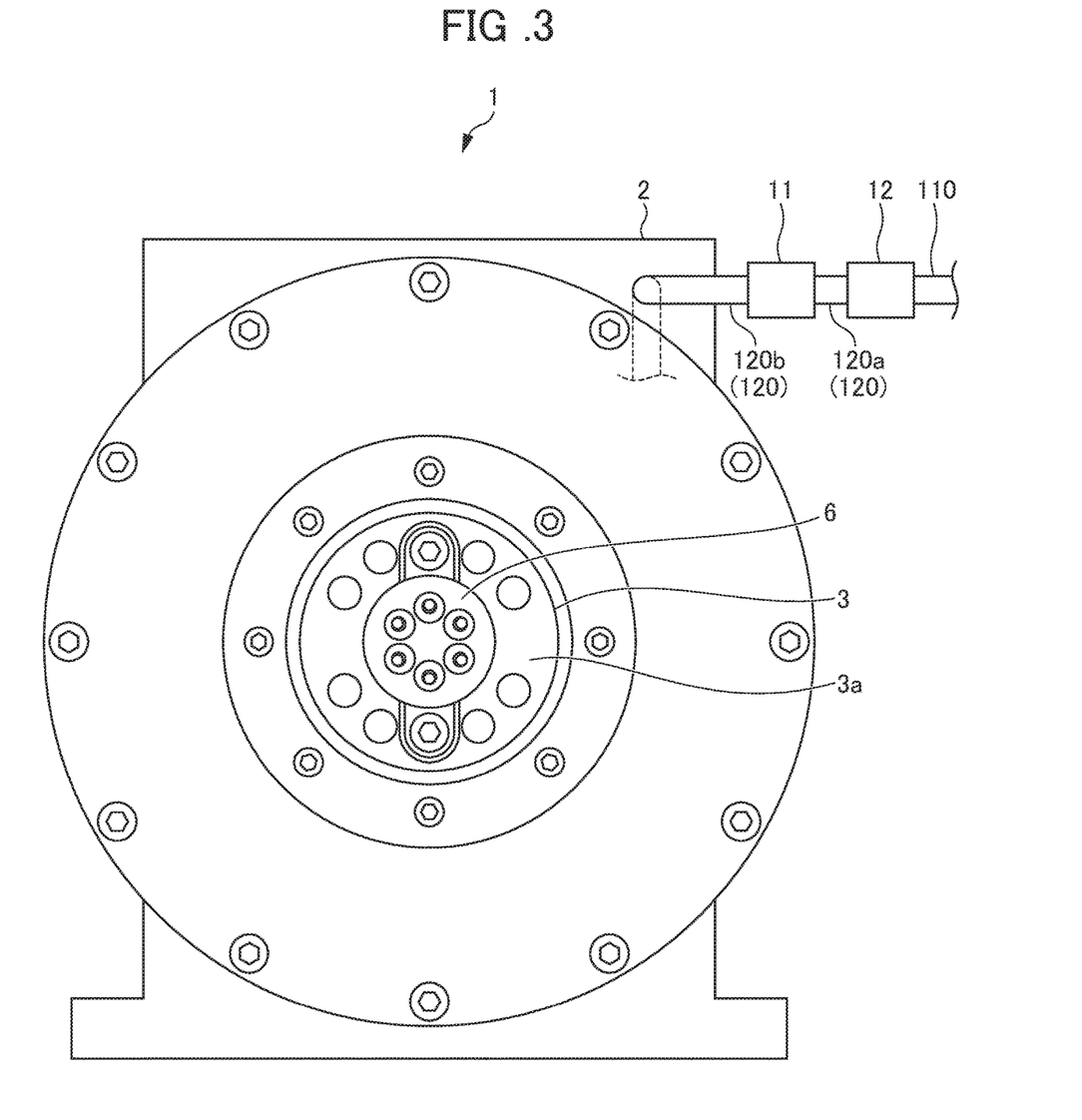
FIG. 3 is a front view looking at the rotary table device shown in FIG. 1 from a front end face side.

Hereinafter, embodiments of the present invention will be explained using the drawings. FIG. 1 is a block diagram showing an outline of a rotary table system 10 according to the present invention. FIG. 2 is a cross-sectional view showing an example of a rotary table device 1 according to the present invention. FIG. 3 is a front view looking at the rotary table device 1 shown in FIG. 1 from a front end face side.

As shown in FIG. 1, the rotary table system 10 includes: a rotary table device 1; and a compressor 100 that generates compressed air as the working fluid. The rotary table device 1 includes: a pressure regulating valve 12, detector 11 as a detection unit 11, case 2, rotating shaft 3 (refer to FIG. 2), clamping mechanism 4, air purge mechanism 8 as a purging mechanism, changeover valve 131, rotary joint 5 (refer to FIG. 2), and control device 200, as shown in FIGS. 1 to 3. The rotating shaft 3, clamping mechanism 4, air purge mechanism 8, changeover valve 131, and rotary joint 5 are housed inside of the case 2. The pressure regulating valve 12, detector 11 and control device 200 are arranged outside of the case 2. In the present embodiment, "front end" in the rotary table device 1 shown in FIG. 2 refers to the end on the face plate side of the rotary table 3 to which the workpiece, tool, etc. are mounted (right end in FIG. 2), and the "back end" refers to an end on the opposite side to the face plate (left end in FIG. 2).

The compressor 100 is connected to the pressure regulating valve 12 of the rotary table device 1 via an air supply channel 110, as shown in FIG. 1. The air supply channel 110 has an upstream side connected to the compressor 100, and a downstream side connected to the pressure regulating valve 12 of the rotary table device 1.

The compressor 100 generates compressed air to supply to the rotary table device 1. The compressor 100 is coupled to the clamping mechanism 4 and air purge mechanism 8 via the air supply channel 110 and an air introduction channel 120, and is able to supply compressed air (working fluid) to the clamping mechanism 4 and air purge mechanism 8. The clamping mechanism 4 and air purge mechanism 8 operate by way of the compressed air.

The pressure regulating valve 12 is connected to a downstream-side end of the air supply channel 110, as shown in FIGS. 1 and 3. The pressure regulating valve 12 is capable of adjusting the pressure value of compressed air supplied to the clamping mechanism 4 and air purge mechanism 8. The pressure regulating valve 12 is a valve for adjusting the pressure value of the compressed air supplied to the changeover valve 131 and the air purge mechanism 8 on the downstream side of the air introduction channel 120.

The compressed air for which the pressure value was adjusted by the pressure regulating valve 12 is flowed through the air introduction channel 120 towards the clamping mechanism 4 and air purge mechanism 8. The air introduction channel 120 is a channel introducing the compressed air for which the pressure valve was adjusted by the pressure regulating valve 12 to inside of the case 2. The air introduction channel 120 has an upstream-side introduction path 120a from the pressure regulating valve 12 until the detector 11, and the downstream-side introduction path 120b from the detector 11 until a branching path 120c.

The detector 11 is arranged in the middle of the air introduction channel 120, as shown in FIGS. 1 and 3. The detector 11 detects the pressure or flow rate of compressed air for which the pressure value was adjusted by the pressure regulating valve 12 supplied from the compressor 100. The pressure value and flow rate value of compressed air detected by the detector 11 is judged in the control device 200 described later, and notification information according to the pressure value and/or flow rate value of the compressed air is notified by the notification section 220 described later.

The air introduction channel 120 branches at the branching path 120c on the downstream-side end of the downstream-side introduction part 120b into the first branching channel 121 towards the clamping mechanism 4, and the second branching channel 122 towards to the air purge mechanism 8. The changeover valve 131 is provided to the first branching channel 121.

Between the changeover valve 131 and clamping mechanism 4 is connected by the two channels of the clamping flow channel 121a and the unclamping flow channel 121b. The clamping flow channel 121a supplies compressed air for clamping operation to the clamping mechanism 4. The unclamping flow channel 121b supplies compressed air for unclamping operation to the clamping mechanism 4. The changeover valve 131 operates so as to switch the channel of compressed air supplied from the compressor 100 to either one of the clamping flow channel 121a or unclamping flow channel 121b.

The air purge mechanism 8 is connected to the downstream-side end of the second branch channel 122. The second branch channel 122 supplies compressed air for purging to the air purge mechanism 8. By adjusting the pressure regulating valve 12, the pressure value of the compressed air supplied from the compressor 100 to the air purge mechanism 8 is adjusted. By the air purging operation performed in the air purge mechanism 8 supplying the compressed air inside of the case 2 of the rotary table mechanism 1, the pressure inside of the case 2 of the rotary table device 1 is set to higher than atmospheric pressure. It is thereby possible to prevent intrusion of cutting oil into the case 2.

As shown in FIGS. 2 and 3, the rotating shaft 3 of the rotary table device 1 is rotatably supported inside of the case 2 via a bearing 21. The front end face 3a of the rotating shaft 3 constitutes a face plate to which the workpiece, tool, etc. are attached. At the central part of the rotating shaft 3, a shaft hole 31 in a cross-sectional circular shape penetrating along the axial direction is formed.

The rotating shaft 3 is configured, in order from the front end side, by a cylindrical rotating shaft main body 32, a rotor part 33 overhanging more in the radial direction than the rotating shaft main part 32, and a rear plate part 34 being integrally assembled. The rotor 35 is fixed to the rotor part 33. The stator 22 is fixed to the inner side of the case 2. The stator 22 is arranged so as to surround the circumference of the rotor 35.

The aforementioned clamping mechanism 4 is arranged at the rear end side of the rotating shaft 3, and is configured by a clamp member 41, brake disk 42, disk holder 43, and cylinder unit 44.

The clamp member 41 is a ring-like member, and is arranged so as to fit over the rear end part of the rotating shaft 3. The clamp member 41 is fixed coaxially with the rotating shaft 3 to be unrotatable relative to the case 2.

The brake disk 42 is a ring-like plate member having substantially the same outside diameter as the clamp member 41. The brake disk 42 is fixed coaxially with the rotating shaft 3 to be unrotatable relative to the rotating shaft 3, to the rear end face 3b of the rotating shaft 3, by a ring-like disk holder 43 having a smaller outside diameter than the clamp member 41.

The brake unit 44 is a ring-like unit, and is mounted to the rear end face 2b of the case 2, coaxially with the rotating shaft 3 to be unrotatable relative to the case 2. The cylinder unit 44 fits over the disk holder 43 via the oil seal 46, and covers the entirety of the clamp member 41 and brake disk 42.

The cylinder unit 44 includes a piston 45 that is movable by hydraulic or pneumatic working fluid. The piston 45 is arranged so as to sandwich the brake disk 42 with the clamp member 41.

In the clamping mechanism 4 configured in the above way, the piston 45 moves to the side of the clamp member 41, in the case of the compressed air for clamping operation being supplied to the clamping flow channel 121a. The piston 45 thereby clamps the brake disk 42 with the clamp member 41 to establish the rotating shaft 3 in an unrotatable resting state. On the other hand, in the case of compressed air for unclamping operation being supplied to the unclamping flow path 121b, the piston 45 moves to the opposite direction from the clamp member 41. The piston 45 thereby unclamps the brake disk 42, and establishes the rotating shaft 3 as rotatable.

The rotary joint 5 includes a rotary shaft 6, and distributer 7. The distributer 7 is inserted in the shaft hole 61 formed in the rear end 6b of the rotary shaft 6, and is fixed to the cylinder unit 44 by a bolt (not illustrated).

The control device 200 performs various controls of the rotary table device 1. The control device 200 includes a control unit 210 and storage unit 250, as shown in FIG. 1.

The storage unit 250 has a transition information storage section 251, and judgment value storage section 252.

The transition information storage section 251 acquires and stores transition information, which is information related to the transition of pressure value or flow rate value of the compressed air (working fluid) detected by the detector 11.

The judgment value storage section 252 stores in advance a plurality of sets of judgment value information related to a judgment value for judging the pressure value or flow rate value of compressed air (working fluid). In the present embodiment, as a plurality of sets of judgment value information, the judgment value storage section 252 stores in advance a plurality of judgment ranges for judging the pressure value or flow rate value of compressed air.

In the present embodiment, it includes an NG range R1, recommended range R3, and caution range R2 (range between NG range R1 and recommended range R3) as the plurality of judgment ranges. In addition, the judgment value storage section 252 stores in advance a plurality of thresholds V1, V2, V3 (judgment values) serving as the criteria of each judgment range (refer to FIGS. 4 to 7). The plurality of thresholds and plurality of judgment ranges stored in the judgment value storage section 252 are obtained in advance by way of experiments, etc.

The control unit 210 controls operation of the rotary table device 1. The control unit 210 is electrically connected to various sensors, switches and the like, and executes various controls such as clamp control, which is control of the clamping/unclamping operations, and air purge control, which is control of the air purging operation.

The control unit 210 has a notification section 220. The notification section 220 notifies the operating conditions of the rotary table device 1. The notification section 220 notifies various notification information according to the pressure value or flow rate value of the compressed air, based on the transition information stored in the transition information storage section 251 and the plurality of sets of judgment value information stored in advance in the judgment value storage section 252. In the present embodiment, the notification section 220 notifies the notification information by way of display of a message by display or lamps, sound generation by a buzzer, and notification of a message or the like using a communication means.

More specifically, the notification section 220 notifies the following such notification information. The notification section 220, for example, notifies information (information such as being declining trend, or transitioning various judgment ranges) of the pressure value or flow rate value of the compressed air (working fluid) as the notification information.

In addition, the notification section 220, for example, in the case of the pressure value or flow rate value of compressed air being in a declining trend in the transition range R3, notifies the first notification matter as the notification information, and in the case of there being a pressure value or flow rate value of compressed air in the caution range R2, notifies the second notification matter as the notification information.

In the present embodiment, the first notification matter is notification matter prompting an alert, for example, matter of concern. The second notification matter is a notification matter of a warning prompting to raise the pressure value or flow rate value of compressed air, e.g., an improvement matter.

In the present embodiment, the notification of a matter of concerning, which is an exemplification of the first notification matter (notification matter prompting alert), for example, is a notification for a case of being concern over clamping/unclamping operations or air purging operation not being sufficiently exhibited if the pressure value of compressed air declines as is. In addition, the notification of an improvement matter which is an exemplification of the second notification matter (notification matter of a warning prompting to raise the pressure value or flow rate value of compressed air), for example, is a notification for a case of recognizing that an improvement is necessary due to being concern over the pressure value of compressed air being switched over to the NG region R1. It should be noted that, in the present embodiment, an example of defining the first notification matter as a matter of concern, and defining the second notification matter as an improvement matter has been explained; however, it is not to be limited thereto, and the contents of each notification matter can be arbitrarily set according to the respective conditions.

Figure 4:
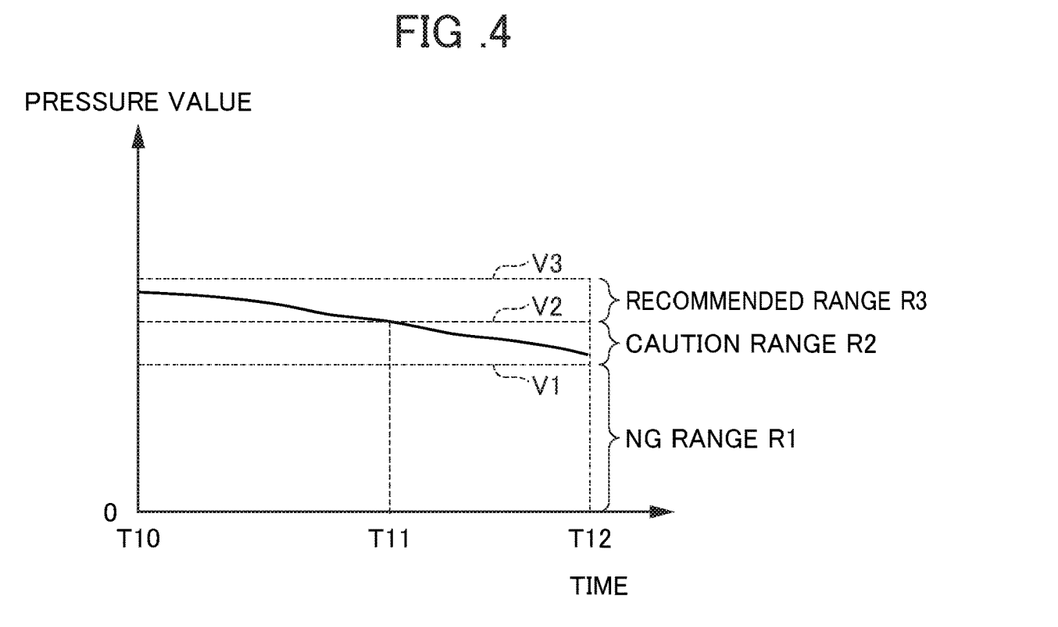
FIG. 4 is a graph showing a first operation example.
Figure 5:
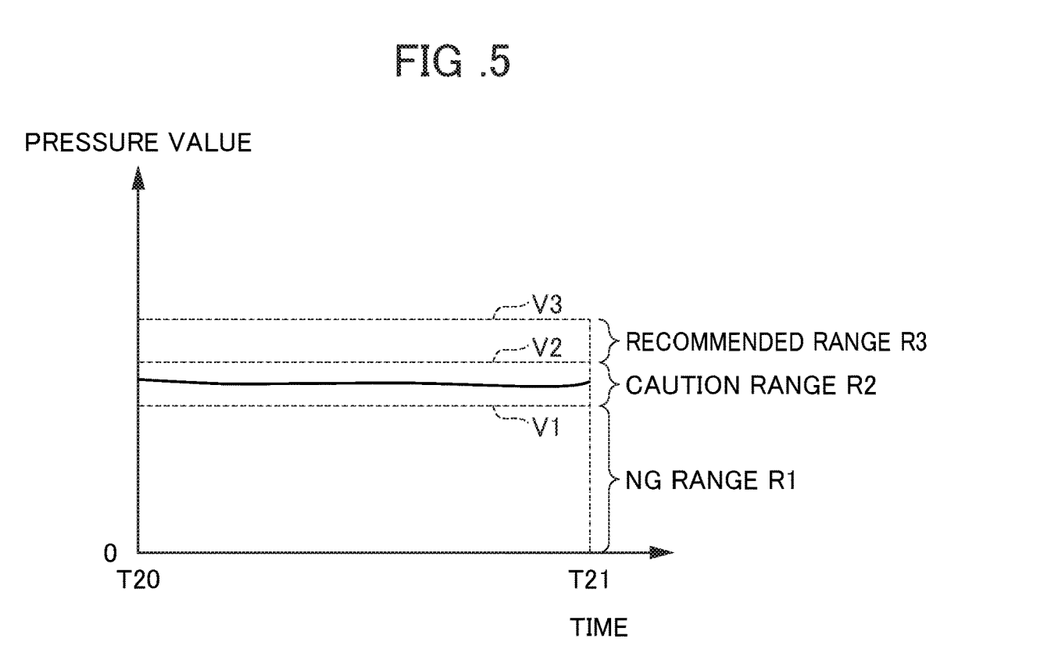
FIG. 5 is a graph showing a second operation example.
Figure 6:
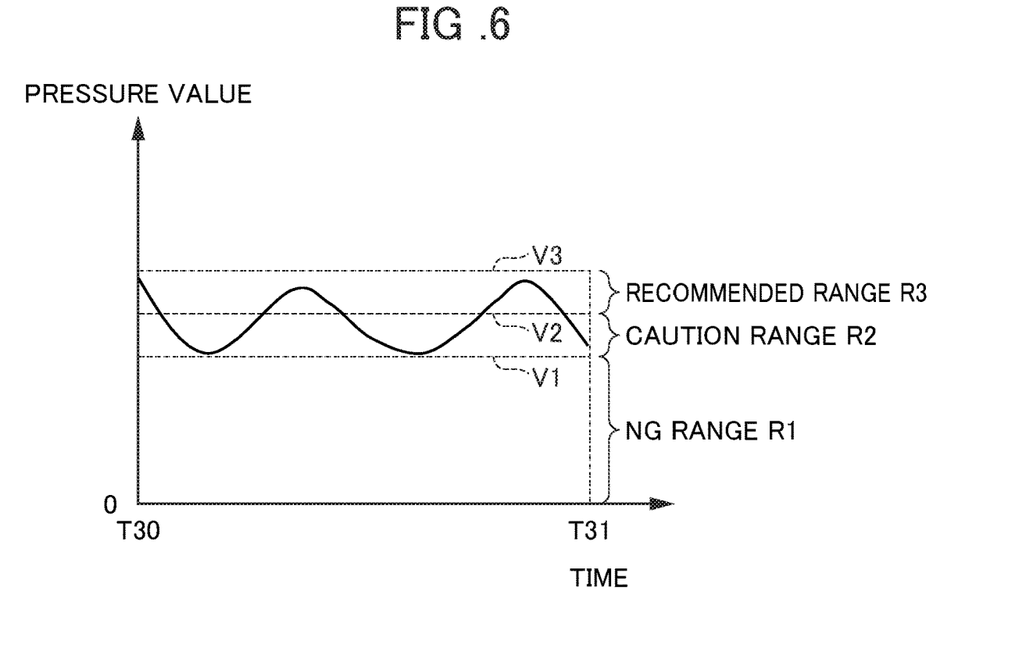
FIG. 6 is a graph showing a third operation example.
Figure 7:
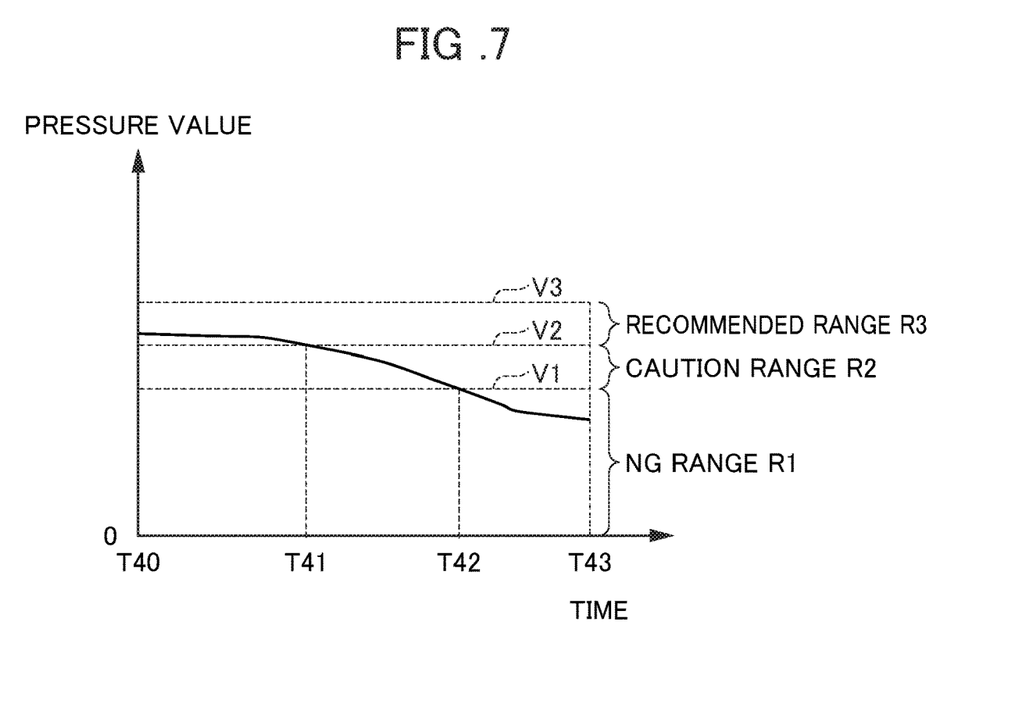
FIG. 7 is a graph showing a fourth operation example.

Next, the notification control notified by the notification section 220 of the rotary table device 1 will be explained by the following first operation example to fourth operation example. FIG. 4 is a graph showing a first operation example. FIG. 5 is a graph showing a second operation example. FIG. 6 is a graph showing a third operation example. FIG. 7 is a graph showing a fourth operation example. The following first operation example to fourth operation example are examples of notifying various notification information according to the pressure value of compressed air supplied by the compressor 100.

In addition, for criteria of the pressure value of the compressed air in the first operation example to fourth operation example, the first threshold V1, second threshold V2, and third threshold V3 (first threshold V1<second threshold V2<third threshold V3) are set, and NG range R1 (range of 0~first threshold V2), caution range R2 (range of first threshold V1 ~second threshold V2), and recommended range R3 (range of second threshold V2~third threshold V3) are set.

In the present embodiment, for the judgment range of operations by the clamping mechanism 4, for example, the recommended range R3 is a range in which use is possible without a decline in clamping torque or delay in clamping/unclamping operations. The NG range R1 is a range in which a decline in clamping torque or delay in clamping/unclamping operation occurs and said to have a problem in the operation of the clamping mechanism 4. The caution range R2 is a range between the recommended range R3 and NG range R1, and is a range in which there is concern over entering the NG range R1 if the pressure of the compressed air declines more than this.

(First Operation Example)

The first operation example is an operation example for a case of, in the clamping/unclamping operation of the clamping mechanism 4 or the air purging operation of the air purge mechanism 8, the pressure value of compressed air being in a declining trend in the recommended range R3, and declining until the caution range R2 from the elapse of time, and being in a declining trend also in the caution range R2, as shown in FIG. 4.

In the first operation example, since the pressure value of compressed air is in a declining trend as a whole, for example, the notification section 220 notifies the contents of "pressure value of compressed air is declining trend".

In addition, the notification section 220, for example, notifies of various notification information according to the pressure value of the compressed air in each time band.

For example, in the range of the time course T10~T11 in FIG. 4, since the pressure value of compressed air is in a declining trend in the recommended range R3, the notification section 200 notifies of a matter of concern (first notification matter). The matter of concern is a notification matter prompting an alert. In the present embodiment, the notification of a matter of concern, for example, is a notification for a case of there being concern over the clamping/unclamping operations or air purging operation not being sufficiently exhibited if the pressure value of compressed air declines as is.

As a notification of a matter of concern due to the pressure value of compressed air being in a declining trend in the recommended range R3 in the range of the time course T10~T11 in FIG. 4 of the first operation example, for example, in the clamping/unclamping operation, a notification can be given of contents of "concern over decline in clamping torque or delay in clamping/unclamping operations, if pressure value of compressed air declines as is". In addition, as a notification of a matter of concern, for example, in the air purging operation, a notification can be given of contents of "concern over pressure inside of case 2 of rotary table device 1 being insufficient for air purge, and infiltration of cutting fluid into case 2, if pressure value of compressed air declines as is".

In addition, in the range of the time course T11~T12 in FIG. 4, since the pressure value of compressed air transitions the caution range R2, and the pressure value of compressed air is in a declining trend in the caution range R2, the notification section 220 notifies of improvement matter (second notification matter). The improvement matter is a notification matter of warning prompting to raise the pressure value or flow rate value of compressed air. In the present embodiment, the notification of improvement matter, for example, is a notification for a case of being recognized that improvement is necessary since there is concern of cross over to the NG range R1 for the pressure value of compressed air.

As a notification improvement matter due the pressure value of compressed air being in a declining trend in the caution range R2 in the range of time course T11~T12 in FIG. 4 of the first operation example, for example, in the clamping/unclamping operation and air purging operation, a notification can be given of contents of "pressure of compressed air checked, and requires raising the pressure of compressed air up to recommended range R3".

(Second Operation Example)

The second operation example is an operation example for a case of the pressure value of compressed air transitioning in the caution range R2 as shown in FIG. 5, in the operation of the clamping mechanism 4.

In the second operation example, since the pressure value of compressed air as a whole transitions the caution range R2, for example, the notification section 220 notifies of the contents of "pressure value of compressed air transitioning the caution range R2".

In addition, the notification section 220 notifies of various notification information according to the pressure value of compressed air, in each time band, for example. For example, in the range of the time course T20~T21 shown in FIG. 5 of the second operation example, the pressure value of compressed air is transitioning the caution range R2. For this reason, the notification section 220 notifies of the improvement matter (second notification matter). As the notification of improvement matter, for example, it is possible to give the notification of the same contents as the notification of the improvement matter in the first operation example.

(Third Operation Example)

The third operation example is an operation example for a case of, in the operation of the clamping mechanism 4, the pressure value of compressed air fluctuating by repeating decline and rise, so as to go back and forth in the ranges of the recommended range R3 and caution range R2, in the range of the time course T30~T31, as shown in FIG. 6.

In the third operation example, since the pressure value of air pressure as a whole fluctuates by repeating decline and rise so as to go back and forth in the ranges of recommended range R3 and caution range R2, for example, the notification section 220 notifies of contents of "pressure value of compressed air fluctuating by repeatedly declining and rising between ranges recommended range R3 and caution range R2".

In addition, the notification section 220, for example, notifies of various notification information according to the pressure value of compressed air in each time band. For example, in the range of time course T30~T31 in FIG. 6 of the third operation example, in the case of the pressure value of compressed air being in a declining trend in the recommended range R3, the notification section 220 notifies of the matter of concern (first notification matter).

In the third operation example, in the case of the pressure value of compressed air being in a declining trend in the recommended range R3, as the notification of matter of concern, a notification can be given of contents of "concern over decline of clamping torque and delay in clamping/unclamping operations", for example, in the clamping/unclamping operation. In addition, as the notification of matter of concern, for example, in the air purging operation, a notification can be given of contents of "concern over the pressure inside of the case 2 of rotary table device 1 being insufficient for air purging and infiltration of cutting fluid into case 2, if pressure value of compressed air declines as is".

In addition, in the range of the time course T30~T31 in FIG. 6 of the third operation example, in the case of the pressure value of compressed air transitioning the caution range R2, the notification section 220 notifies of the improvement matter (second notification matter) irrespective of whether or not being a declining trend. In the third operation example, as the notification of improvement matter in the case of the pressure value of compressed air transitioning the caution range R2, for example, in the clamping/unclamping operation and air purging operation, a notification can be given of the contents of "since pressure value of compressed air is fluctuating in ranges of recommended range R3 and caution range R2, it is necessary to eliminate pressure variation, or raise pressure value of compressed air to enter recommended range R3".

(Fourth Operation Example)

The fourth operation example is an operation example for a case of operation of, in the clamping mechanism 4, the pressure value of compressed air being in a declining trend that declines in order of the recommended range R3, caution range R2 and NG range R1 with the elapse of time, as shown in FIG. 7.

In the fourth operation example, since the pressure value of compressed air is in a declining trend, passes through the caution range R2, and declines until the NG range R1, for example, the notification section 220 notifies of contents of "pressure value of compressed air is in declining trend", and in the case of entering the caution range R2, notifies of contents of "entered into caution range R2", and in the case of entering the NG range R1, notifies of contents of "entered into NG range R1".

In addition, the notification section 220 notifies of various notification information according to the pressure value of compressed air in each time band, for example.

For example, in the time course T40~T41 in FIG. 7 of the fourth operation example, since the pressure value of compressed air is in a declining trend in the recommended range R3, the notification section 220 notifies of matter of concern (first notification matter). As the notification of the matter of concern, for example notification can be given of the same contents as the notification of the matter of concern in the first operation example.

In addition, in the time course T41~T42 in FIG. 7, in the case of the pressure value of compressed air transitioning the caution range R2, the notification section 220 notifies of the improvement matter (second notification matter) irrespective of whether being in a declining trend. As the notification of the improvement matter, for example, notification can be given of the same contents as notification of improvement matters in the first operation example. In addition, in the time course of T41~T42, the notification section 220 notifies of improvement matters of the contents of "pressure value of compressed air entered caution range R2", since the pressure value of compressed air declined and entered the caution range R2, for example.

In addition, in the time course of T42~T43 in FIG. 7, the notification section 220 notifies of improvement matters of contents of "pressure value of compressed air entered NG range R1), since the pressure value of compressed air declined and entered the NG range R1, for example.

In the above first operation example to fourth operation example, in the case of the pressure value of compressed air fluctuating, it is possible to grasp the fluctuation in pressure value of compressed air in advance prior to a malfunction occurring in the rotary table device 1, by way of the information notified by the notification section 220. Based on the information notified by the notification section 220, it is thereby possible to adjust the pressure value of the compressed air according to manual operation by an operator. Therefore, in the rotary table device 1, it is possible to prevent the occurrence of a malfunction before it happens.

According to the rotary table device 1 of the present embodiment equipped with the above configuration, the following effects are exerted.

In the present embodiment, the rotary table device 1 is configured to be a rotary table device 1 equipped with a clamping mechanism 4 and air purge mechanism 8 which operate by way of compressed air (working fluid), the device including: a detector 11 which detects the pressure or flow rate of compressed air; a transition information storage section 251 that acquires and stores transition information related to the transition of pressure value or flow rate value of compressed air detected by the detector 11; a judgment value storage section 252 that stores in advance a plurality of sets of judgment value information related to the judgment values for judging the pressure value or flow rate value of compressed air; and the notification section 220 that notifies of notification information according to the pressure value or flow rate value of compressed air, based on the transition information stored in the transition information storage section 251 and the plurality of sets of judgment value information stored in the judgment value storage section 252. For this reason, it is possible to notify of notification information according to the present value of compressed air. In the case of the pressure value of compressed air having fluctuated, it is thereby possible to grasp the fluctuation in pressure value of compressed air in advance prior to malfunction occurring in the rotary table device 1. Therefore, it is possible to prevent the occurrence of malfunction in the rotary table device 1 before it happens.

In addition, with the present embodiment, the judgment value storage section 252 stores in advance a plurality of judgment ranges for judging the pressure value or flow rate value of compressed air as a plurality of sets of judgment value information; the plurality of judgment ranges include the NG range R1, recommended range R3 and caution range R2; the notification section 220 notifies of the first notification matter as notification information in the case of the pressure value or flow rate value of compressed air being in a declining trend in the recommended range R3, and notifies of the second notification matter as notification information in the case of the pressure value or flow rate value of compressed air transitioning in the caution range R2. It is thereby possible to notify of the appropriate notification information according to the fluctuation in pressure value of compressed air.

In addition, with the present embodiment, the first notification matter is a notification matter prompting alert, and the second notification matter is a notification matter prompting to raise the pressure value or flow rate value of working fluid. The notification section 220 can thereby notify of notification matters according to the condition of the pressure value or flow rate value of working fluid. Therefore, since it is possible to grasp the condition of the rotary table device 1 according to the type of notification matter, it is possible to prevent the occurrence of a malfunction in the rotary table device 1 far before it happens.

It should be noted that the present invention is not limited to each of the above embodiments, and that modifications and improvements of a scope that can achieve the object of the present invention are also encompassed by the present invention. For example, in the aforementioned embodiments, compressed air is used as the working fluid; however, it is not to be limited thereto and, for example, hydraulic oil may be used as the working fluid.

In addition, in the aforementioned embodiment, it is configured so as to detect the pressure value of compressed air, and notify of notification information according to the pressure value of compressed air, in the first operation example to fourth operation example. For example, it may be configured so as to detect the flow rate value of compressed air, and notify of notification information according to the flow rate value of compressed air.

In addition, with the aforementioned embodiments, it is configured to perform adjustment of the pressure value of compressed air by manual operation by an operator based on the information notified by the notification section 220 in the first operation example to fourth operation example; however, it is not to be limited thereto. For example, in the case of being notified by the notification section 220 in the first operation example to fourth operation example, the control unit 210 may automatically control the pressure regulating valve 12 so as to adjust the pressure value of compressed air, based on the information notified by the notification section 220. It is thereby possible to prevent the occurrence of malfunction of the rotary table device 1 before it happens by way of automatic control.

In addition, in the aforementioned embodiments, the rotary table device 1 is configured so as to include both the clamping mechanism 4 and air purge mechanism 8, which operate by way of the compressed air (working fluid); however, it is not limited thereto. The rotary table device 1 may be configured so as to include either one of the clamping mechanism 4 or air purge mechanism 8, which operate by way of the compressed air (working fluid). In this case, the notification section 220 can notify of notification information, for either one of the clamping mechanism 4 or air purge mechanism 8.

EXPLANATION OF REFERENCE NUMERALS

1 rotary table device
2 case
4 clamping mechanism
8 air purge mechanism (purge mechanism)
11 detector (detection unit)
210 control unit
220 notification section
251 transition information storage section
252 judgment value storage section

What is claimed is:

1. A rotary table device comprising:
    both or one of a clamping mechanism and purge mechanism which operate by way of working fluid, the clamping mechanism including a brake disk configured to stop rotation of a rotating shaft, and the purge mechanism being arranged on an interior portion of the rotary table device;
    a detection unit that detects a pressure or flow rate of the working fluid;
    a transition information storage unit that acquires and stores transition information related to transition of a pressure value or flow rate value of the working fluid detected by the detection unit;
    a judgment value storage unit that is programmed to store in advance a plurality of sets of judgment value information related to judgment values for judging a pressure value or flow rate value of the working fluid; and
    a notification unit that notifies of notification information according to the pressure value or flow rate value of the working fluid, based on the transition information stored in the transition information storage unit and the plurality of sets of judgment value information stored in the judgment value storage unit.

2. The rotary table device according to claim 1, wherein the judgment value storage unit stores in advance a plurality of judgment ranges for judging the pressure value or flow rate value of the working fluid, as the plurality of sets of judgment value information,
    wherein the plurality of judgment ranges includes an NG range, a recommended range, and a caution range between the NG range and the recommended range, and
    wherein the notification unit notifies of a first notification matter as the notification information, in a case of the pressure value or flow rate value of the working fluid being in a declining trend in the recommended range, and notifies of a second notification matter as the notification information, in a case of the pressure value or flow rate value of the working fluid transitioning in the caution range.

3. The rotary table device according to claim 2,
    wherein the first notification matter is a notification matter prompting alert; and
    wherein the second notification matter is a notification matter of a warning prompting to raise the pressure value or flow rate value of the working fluid.

* * * * *